United States Patent
Klein et al.

(10) Patent No.: US 11,247,782 B2
(45) Date of Patent: Feb. 15, 2022

(54) SYSTEM AND METHOD FOR CONTROLLING ROTORCRAFT

(71) Applicant: Textron Innovations Inc., Providence, RI (US)

(72) Inventors: Morganne Cody Klein, Fort Worth, TX (US); Jillian Samantha Alfred, Fort Worth, TX (US); Christopher James Ludtke, Grapevine, TX (US)

(73) Assignee: Textron Innovations Inc., Providence, RI (US)

( * ) Notice: Subject to any disclaimer, the term of this patent is extended or adjusted under 35 U.S.C. 154(b) by 251 days.

(21) Appl. No.: 16/138,053

(22) Filed: Sep. 21, 2018

(65) Prior Publication Data

US 2020/0094981 A1    Mar. 26, 2020

(51) Int. Cl.
| | |
|---|---|
| *B64D 31/06* | (2006.01) |
| *G06F 16/901* | (2019.01) |
| *G05D 17/02* | (2006.01) |
| *B64C 27/06* | (2006.01) |

(52) U.S. Cl.
CPC ............. *B64D 31/06* (2013.01); *G05D 17/02* (2013.01); *G06F 16/9017* (2019.01); *B64C 27/06* (2013.01)

(58) Field of Classification Search
CPC ..... B64C 27/06; B64C 27/14; G06F 16/9017; G06F 17/30952; F05D 2270/091; F05D 2270/093; F05D 2270/095; F05D 2270/13; F02C 6/02; F02C 9/42; F02C 9/46; G05D 17/02; B64D 31/06
See application file for complete search history.

(56) References Cited

U.S. PATENT DOCUMENTS

| | | | |
|---|---|---|---|
| 5,363,317 | A | 11/1994 | Rice et al. |
| 5,873,546 | A | 2/1999 | Evans et al. |
| 9,008,942 | B2 | 4/2015 | Dyrla et al. |
| 2001/0044679 | A1 | 11/2001 | Permanne |

(Continued)

FOREIGN PATENT DOCUMENTS

FR    2971817    *    2/2011

OTHER PUBLICATIONS

"Type-Certificate Data Sheet No. IM.E.017 for PW206 & PW207 series engines," Type Certificate Holder Pratt and Whitney Canada Corp., TCDS No. IM.E.017, Issue: 07, TE.CERT.00052-001, European Aviation Safety Agency, Oct. 6, 2015, 14 pages.

(Continued)

*Primary Examiner* — Hunter B Lonsberry
*Assistant Examiner* — Matthew J. Reda
(74) *Attorney, Agent, or Firm* — Slater Matsil, LLP

(57) ABSTRACT

In an embodiment, a rotorcraft includes: a plurality of engines; a flight control computer connected to the plurality of engines, the flight control computer being configured to: receive an operating parameter of a first engine of the plurality of engines; determine an engine output ramping rate for the first engine according to a difference between the operating parameter of the first engine and a nominal limit of the first engine; and increase the output of the first engine in response to detecting an outage of another engine of the plurality of engines, the output of the first engine being increased according to the engine output ramping rate.

21 Claims, 6 Drawing Sheets

(56) References Cited

U.S. PATENT DOCUMENTS

| | | | |
|---|---|---|---|
| 2009/0107110 A1* | 4/2009 | Ishiba | F02C 6/206 |
| | | | 60/233 |
| 2014/0248121 A1* | 9/2014 | Karam | F02C 3/305 |
| | | | 415/1 |
| 2016/0017817 A1* | 1/2016 | Langford | F02C 9/46 |
| | | | 60/734 |
| 2017/0101938 A1* | 4/2017 | Lescher | F02K 3/12 |
| 2019/0047715 A1* | 2/2019 | Hedrick | B64D 43/00 |

OTHER PUBLICATIONS

Wood, Tom, "One Engine Inoperative (OEI) and Autorotation for Heavy Lift Rotorcraft System," NASA/CR-2012-216038, National Aeronautics and Space Administration, Ames Research Center, Aug. 2012, 16 pages.

* cited by examiner

SYSTEM AND METHOD FOR CONTROLLING ROTORCRAFT

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload.

SUMMARY

In an embodiment, a method includes: receiving an operating parameter of a first engine of a rotorcraft; determining an engine output ramping rate for the first engine according to a difference between the operating parameter of the first engine and a nominal limit of the first engine; and increasing the output of the first engine in response to detecting an outage of another engine of the rotorcraft, the output of the first engine being increased according to the engine output ramping rate.

In some embodiments of the method, increasing the output of the first engine includes: temporarily increasing the output of the first engine beyond the nominal limit of the first engine. In some embodiments of the method, determining the engine output ramping rate includes: calculating the engine output ramping rate at runtime according to the operating parameter of the first engine. In some embodiments of the method, determining the engine output ramping rate includes: selecting the engine output ramping rate from a lookup table, the lookup table being indexed according to the operating parameter of the first engine. In some embodiments, the method further includes: waiting a predetermined amount of time before temporarily increasing the output of the first engine. In some embodiments of the method, receiving the operating parameter includes: selecting the operating parameter from a plurality of operating parameters according to a flight control mode of the rotorcraft; and requesting the operating parameter from the first engine. In some embodiments of the method, the nominal limit of the first engine is a maximum rotation speed of the first engine, and where increasing the output of the first engine includes: temporarily increasing the output of the first engine such that the rotation speed of the first engine exceeds the maximum rotation speed of the first engine by a first predetermined margin. In some embodiments of the method, the nominal limit of the first engine is a maximum torque of the first engine, and where increasing the output of the first engine includes: temporarily increasing the output of the first engine such that the torque of the first engine exceeds the maximum torque of the first engine by a second predetermined margin. In some embodiments of the method, the nominal limit of the first engine is a maximum temperature of the first engine, and where increasing the output of the first engine includes: temporarily increasing the output of the first engine such that the temperature of the first engine exceeds the maximum temperature of the first engine by a third predetermined margin. In some embodiments of the method, the engine output ramping rate is proportional to the difference between the operating parameter of the first engine and the nominal limit of the first engine.

In an embodiment, a rotorcraft includes: a plurality of engines; a flight control computer connected to the plurality of engines, the flight control computer being configured to: receive an operating parameter of a first engine of the plurality of engines; determine an engine output ramping rate for the first engine according to a difference between the operating parameter of the first engine and a nominal limit of the first engine; and increase the output of the first engine in response to detecting an outage of another engine of the plurality of engines, the output of the first engine being increased according to the engine output ramping rate.

In some embodiments of the rotorcraft, the flight control computer increases the output of the first engine by: temporarily increasing the output of the first engine beyond the nominal limit of the first engine. In some embodiments of the rotorcraft, the flight control computer determines the engine output ramping rate by: calculating the engine output ramping rate at runtime according to the operating parameter of the first engine. In some embodiments of the rotorcraft, the flight control computer determines the engine output ramping rate by: selecting the engine output ramping rate from a lookup table, the lookup table being indexed according to the operating parameter of the first engine. In some embodiments of the rotorcraft, the flight control computer is further configured to: waiting a predetermined amount of time before temporarily increasing the output of the first engine. In some embodiments of the rotorcraft, the flight control computer receives the operating parameter by: selecting the operating parameter from a plurality of operating parameters according to a flight control mode of the rotorcraft; and requesting the operating parameter from the first engine. In some embodiments of the rotorcraft, the nominal limit of the first engine is a maximum rotation speed of the first engine, and where the flight control computer increases the output of the first engine by: temporarily increasing the output of the first engine such that the rotation speed of the first engine exceeds the maximum rotation speed of the first engine by a first predetermined margin. In some embodiments of the rotorcraft, the nominal limit of the first engine is a maximum torque of the first engine, and where the flight control computer increases the output of the first engine by: temporarily increasing the output of the first engine such that the torque of the first engine exceeds the maximum torque of the first engine by a second predetermined margin. In some embodiments of the rotorcraft, the nominal limit of the first engine is a maximum temperature of the first engine, and where the flight control computer increases the output of the first engine by: temporarily increasing the output of the first engine such that the temperature of the first engine exceeds the maximum temperature of the first engine by a third predetermined margin. In some embodiments of the rotorcraft, the engine output ramping rate is proportional to the difference between the operating parameter of the first engine and the nominal limit of the first engine.

In an embodiment, a flight control computer includes: a processor; and a non-transitory computer readable storage medium storing programming for execution by the processor, the programming including instructions for: receiving an operating parameter of a first engine of a rotorcraft; determining an engine output ramping rate for the first engine according to a difference between the operating parameter of the first engine and a nominal limit of the first engine; and increasing the output of the first engine in response to detecting an outage of another engine of the rotorcraft, the output of the first engine being increased according to the engine output ramping rate.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
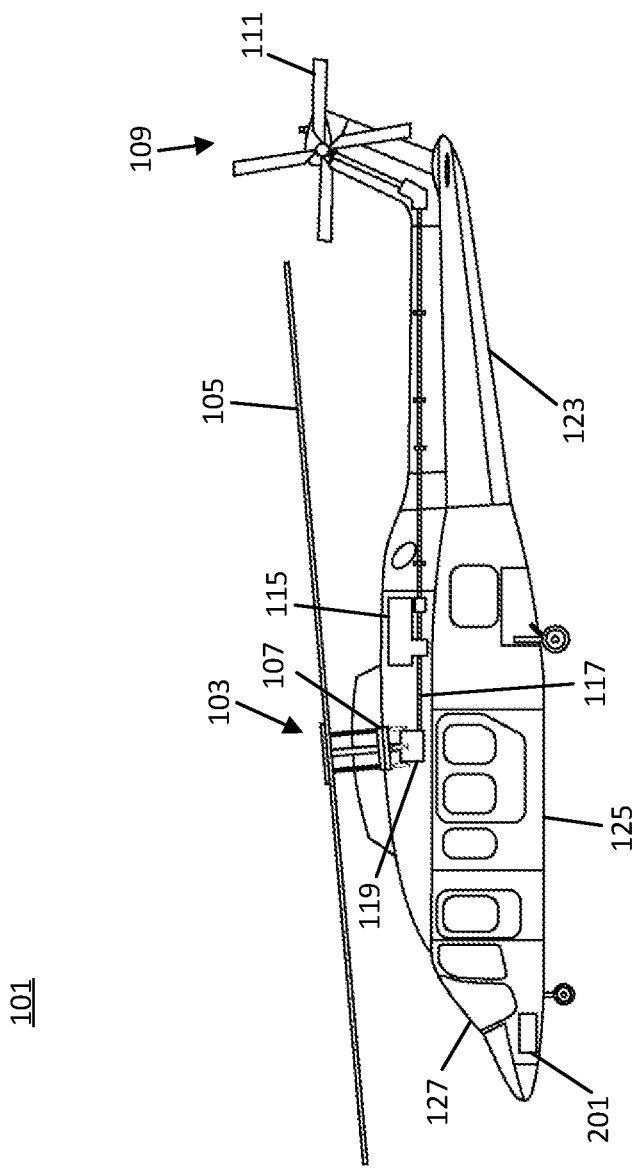
FIG. 1 illustrates a rotorcraft, according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures, provide for default or suggested control positioning, or the like.

FBW systems for rotorcraft must provide stable flight characteristics for FBW system controlled flight parameters while permitting the pilot to override or adjust any suggested flight parameters suggested by the FBW system. Additionally, in providing enhanced control and automated functionality for rotorcraft flight, the FBW system must maintain an intuitive and easy to use flight control system for the pilot. Thus, the FBW system adjusts the pilot flight controls so that the controls are in a position associated with the relevant flight parameter. For example, the FBW system may adjust the collective stick to provide suggested or FBW system controlled flight parameters, and which reflect a collective or power setting. Thus, when the pilot releases the collective stick and the FBW system provides collective control commands, the collective stick is positioned intuitively in relation to the actual power or collective setting so that, when the pilot grasps the collective stick to retake control, the control stick is positioned where the pilot expects the stick to be positioned for the actual collective setting of the main rotor. Similarly, the FBW system use the cyclic stick to, for example, adjust for turbulence, drift or other disturbance to the flight path, and may move the cyclic stick as the FBW system compensates the cyclic control. Thus, when the pilot grasps the cyclic stick to take control of flight from the FBW system, the cyclic stick is positioned to reflect the actual cyclic settings.

FIG. 1 illustrates a rotorcraft 101, according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the main rotor system 103 and the anti-torque system through a main rotor transmission 119 and a tail rotor transmission 121, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain features, the rotorcraft 101 may have a variety of implementation-specific configurations. For instance, in some embodiments, cockpit 127 is configured to accommodate a pilot or a pilot and co-pilot. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely). In yet other contemplated embodiments, rotorcraft 101 could be configured as an unmanned vehicle, in which case cockpit 127 could be eliminated entirely in order to save space and cost.

Figure 2A:
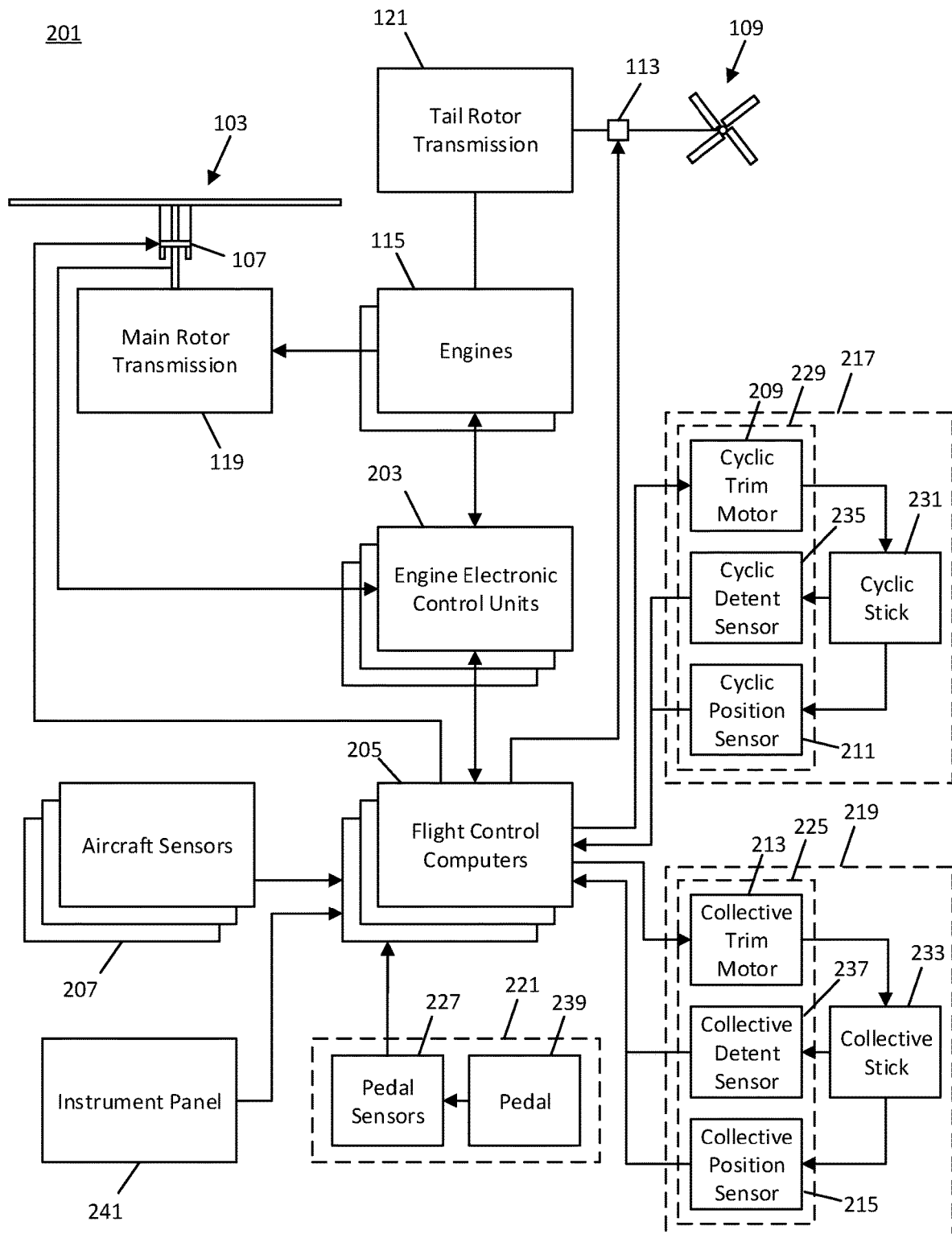
FIG. 2A is a block diagram of a fly-by-wire flight control system, according to some embodiments.
Figure 2B:
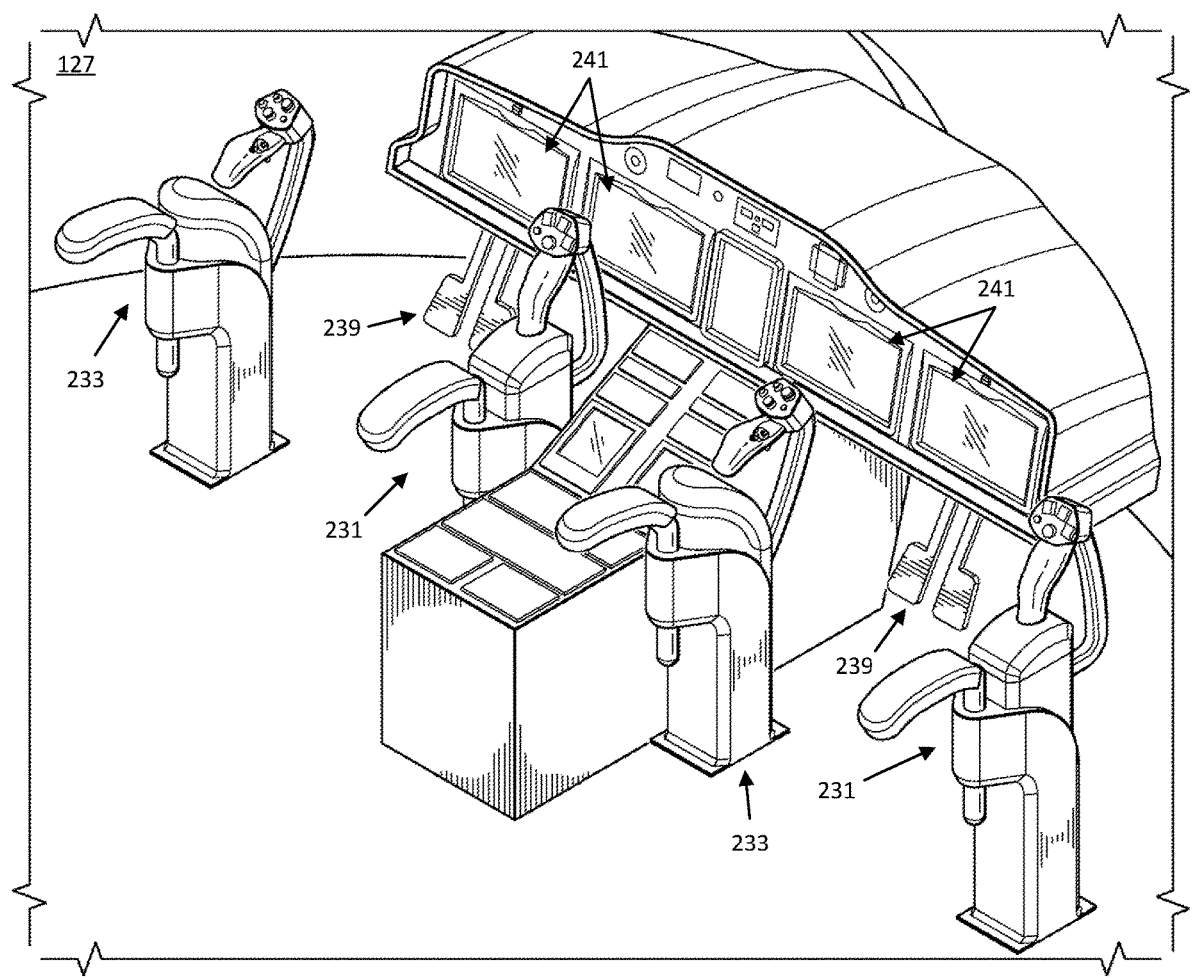
FIG. 2B illustrates the inside of a cockpit, according to some embodiments.

FIG. 2A is a block diagram of a fly-by-wire flight control system 201 for the rotorcraft 101, according to some embodiments. FIG. 2B illustrates the inside of the cockpit 127, according to some embodiments, and is described in conjunction with FIG. 2A. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft 101. Flight control devices on the rotorcraft may include mechanical and/or electrical systems operable to change the positions or angle of attack of the main rotor blades 105 and the tail rotor blades 111 or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cueing commands to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The aircraft sensors 207 are in communication with the FCCs 205. The aircraft sensors 207 may include sensors for measuring a variety of rotorcraft systems, flight parameters, environmental conditions and the like. For example, the aircraft sensors 207 may include sensors for measuring airspeed, altitude, attitude, position, orientation, temperature, airspeed, vertical speed, and the like. Other aircraft sensors 207 could include sensors relying upon data or signals originating external to the rotorcraft, such as a global positioning system (GPS) sensor, a VHF Omnidirectional Range sensor, Instrument Landing System (ILS), and the like.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine revolutions per minute (RPM), engine temperature, main rotor RPM, engine torque or other rotorcraft system conditions or flight conditions. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 209 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic trim motors 209 and collective trim motors 213 may drive the cyclic stick 231 and collective stick 233, respectively, to suggested positions. The cyclic trim motors 209 and collective trim motors 213 may drive the cyclic stick 231 and collective stick 233, respectively, to suggested positions, but this movement capability may also be used to provide tactile cueing to a pilot. The cyclic trim motors 209 and collective trim motors 213 may push the respective stick in a particular direction when the pilot is moving the stick to indicate a particular condition. Since the FBW system mechanically disconnects the stick from one or more flight control devices, a pilot may not feel a hard stop, vibration, or other tactile cue that would be inherent in a stick that is mechanically connected to a flight control assembly. In some embodiments, the FCCs 205 may cause the cyclic trim motors 209 and collective trim motors 213 to push against a pilot command so that the pilot feels a resistive force, or may command one or more friction devices to provide friction that is felt when the pilot moves the stick. Thus, the FCCs 205 control the feel of a stick by providing pressure and/or friction on the stick.

Additionally, the cyclic control assembly 217, collective control assembly 219 and/or pedal control assembly 221 may each have one or more detent sensors that determine whether the pilot is handling a particular control device. For example, the cyclic control assembly 217 may have a cyclic detent sensor 235 that determines that the pilot is holding the cyclic stick 231, while the collective control assembly 219 has a collective detent sensor 237 that determines whether the pilot is holding the collective stick 233. The cyclic detent sensor 235 and collective detent sensor 237 detect motion and/or position of the respective control stick that is caused by pilot input, as opposed to motion and/or position caused by commands from the FCCs 205, rotorcraft vibration, and the like and provide feedback signals indicative of such to the FCCs 205. When the FCCs 205 detect that a pilot has control of, or is manipulating, a particular control, the FCCs 205 may determine that stick to be out-of-detent (OOD). Likewise, the FCCs may determine that the stick is in-detent (ID) when the signals from the detent sensors indicate to the FCCs 205 that the pilot has released a particular stick. The FCCs 205 may provide different default control or automated commands to one or more flight systems based on the detent status of a particular stick or pilot control.

Figure 3:
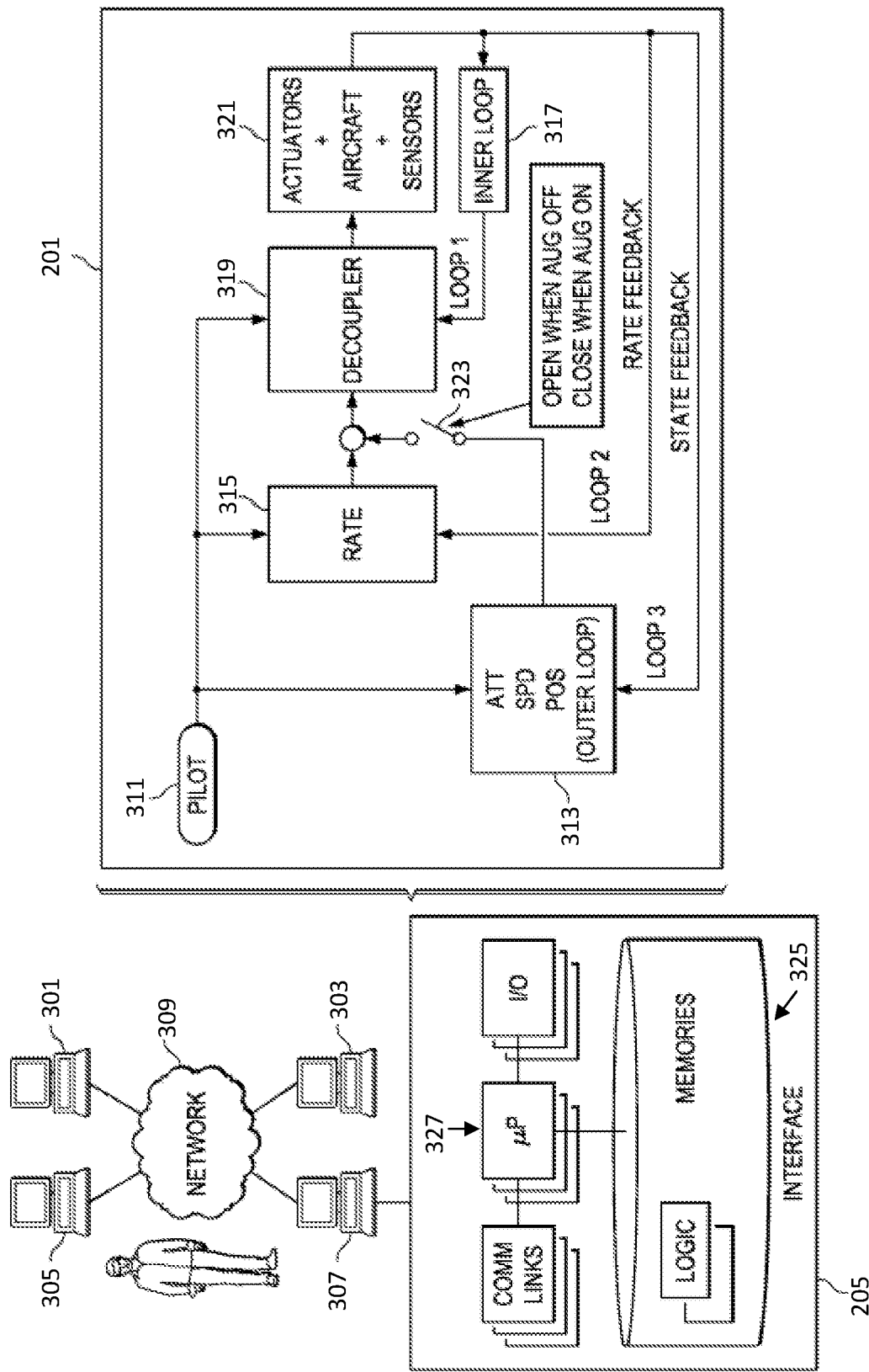
FIG. 3 is a block diagram of a three-loop flight control system, according to some embodiments.

FIG. 3 is a block diagram of the flight control system 201, according to some embodiments. Some operational aspects of the flight control system 201 are shown in a highly schematic fashion. In particular, the flight control system 201 is schematically shown as being implemented as a series of inter-related feedback loops running certain control laws. Although the flight control system 201 is illustrated as being a three-loop flight control system, it should be appreciated that the flight control system 201 could be implemented in a different manner, such as with a different quantity of control loops.

In some embodiments, elements of the flight control system 201 may be implemented at least partially by the FCCs 205. However, all, some, or none of the components (301, 303, 305, 307) of flight control system 201 could be located external or remote from the rotorcraft 101 and communicate to on-board devices through a network connection 309.

The flight control system 201 has a pilot input 311, an outer loop 313, a middle loop 315, an inner loop 317, a decoupler 319, and aircraft equipment 321 (corresponding, e.g., to flight control devices such as swashplate 107, tail rotor transmission 121, etc.; to actuators (not shown) driving the flight control devices; to sensors such as aircraft sensors 207, cyclic position sensors 211, collective position sensors 215, cyclic detent sensors 235, collective detent sensors 237, etc.; and the like).

In the example shown, a three-loop design separates the inner stabilization and rate feedback loops from outer guidance and tracking loops. The control law structure primarily assigns the overall stabilization task and related tasks of reducing pilot workload to inner loop 317. Next, the middle loop 315 (sometimes called the rate loop) provides rate augmentation. Outer loop 313 focuses on guidance and tracking tasks. Since inner loop 317 and middle loop 315 provide most of the stabilization, less control effort is required at the outer loop level. As representatively illustrated, a switch 323 may be provided to turn outer loop flight augmentation on and off, the tasks of outer loop 313 are not necessary for flight stabilization.

In some embodiments, the inner loop 317 and middle loop 315 include a set of gains and filters applied to roll/pitch/yaw 3-axis rate gyro and acceleration feedback sensors. Both the inner loop and rate loop may stay active, independent of various outer loop hold modes. Outer loop 313 may include cascaded layers of loops, including an attitude loop, a speed loop, a position loop, a vertical speed loop, an altitude loop, and a heading loop. According to some embodiments, the control laws running in the illustrated loops allow for decoupling of otherwise coupled flight characteristics, which in turn may provide for more stable flight characteristics and reduced pilot workload. Furthermore, the outer loop 313 may allow for automated or semi-automated operation of certain high-level tasks or flight patterns, thus further relieving the pilot workload and allowing the pilot to focus on other matters including observation of the surrounding terrain.

The flight control system 201 may be realized as programming executed by the FCCs 205. The programming includes instructions implementing aspects of the flight control system 201. The FCCs 205 may include memories 325, such as non-transitory computer readable storage mediums, that store the programming. One or more processors 327 are connected to the memories 325, and are operable to execute the programming.

During normal circumstances, the engines 115 operate below a nominal operating limit. The nominal operating limit may be the maximum continuous output limit of the engines 115, e.g., the maximum output that allows the engines 115 to operate continuously over a long period of time. The maximum continuous output limit may be an engine speed, engine torque, engine temperature, or combination thereof. Although the engines 115 may be capable of temporarily exceeding their nominal limit, doing so may wear out the engines 115 quickly, reducing the mean time between engine failure and/or rebuild.

As noted above, there may be a plurality of engines 115. More than one engine 115 allows for redundancy, such that a single engine outage may not result in total failure of the rotorcraft 101. In some embodiments, the engines 115 may operate in tandem under normal circumstances such that each engine 115 provides some power for the main rotor system 103, and no engine 115 exceeds its nominal limit during proper operation.

During an engine failure, the output of the remaining engine(s) 115 is increased so that the rotorcraft 101 may maintain its present flight condition or mode. For example, if one of the control loops is maintaining an altitude hold for the rotorcraft 101, then the output of the remaining engine(s) 115 is increased to try and maintain that hold. In some embodiments, the output of the remaining engines 115 may be temporarily increased beyond their nominal limit. Although such an increase may damage the remaining engines 115 in the long-term, it may also help prevent a total failure of the rotorcraft 101. Rapidly increasing the output of the remaining engines 115 may place strain on the engines 115. When the remaining engines 115 are already operating near their nominal operating limit, too rapid of an increase may cause the maximum possible output of the engines 115 or drive system to be exceeded, such as an over-torque situation, an overheating situation, or the like.

In accordance with some embodiments, a ramping rate for the remaining engines 115 is varied. For example, during an engine failure, the output of the remaining engines 115 may be gradually increased at a configured ramping rate. The rate of increase of the ramping rate may be a transition other than a step jump. Using a gradual rate of increase may reduce the chances of overshooting the new target engine output, and may avoid exceeding the maximum possible output of the engines 115 or drive system when the output of the remaining engines 115 is temporarily increased beyond their nominal limit. In some embodiments, the ramping rate is predetermined. In some embodiments, the ramping rate is determined on-the-fly based on operating parameters of the remaining engines 115. The operating parameters of the engines 115 may be used to determine the remaining engine output headroom and a more aggressive ramping rate may be used when the remaining engines 115 have sufficient output headroom remaining, allowing flight of the rotorcraft 101 to be maintained and/or more quickly stabilized after an engine failure.

Figure 4:
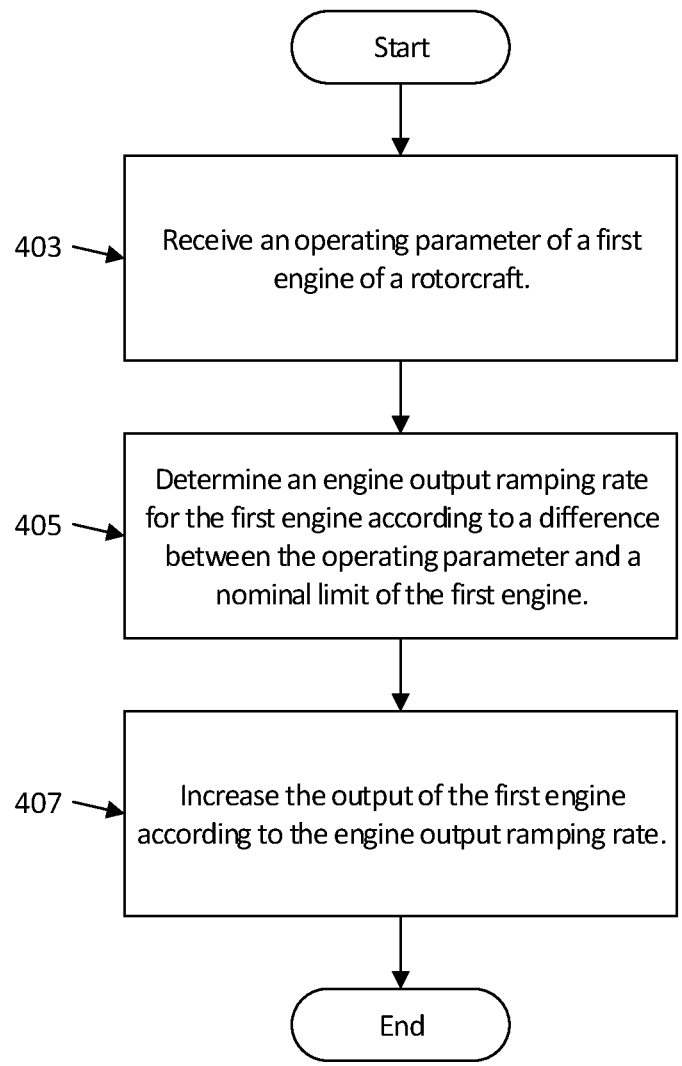
FIG. 4 is a flow diagram of a method for increasing engine output during an outage, according to some embodiments.

FIG. 4 is a flow diagram of a method 401 for increasing engine 115 output during an outage, according to some embodiments. The method 401 may be implemented as a feature of the flight control system 201, and may be performed by the FCCs 205. The method 401 implements an embodiment where the ramping rate is determined on-the-fly, and may be performed in all control modes, e.g., regardless of whether outer loop flight augmentation features of the flight control system 201 are on or off.

In process 403, an operating parameter for a first engine 115 of the rotorcraft 101 is received. The operating parameter may be one of a plurality of operating parameters received from the engines 115. Signals received by the FCCs 205 from the ECCUs 203 may include or indicate the operating parameters. Examples of operating parameters include the current torque produced by the first engine 115, the current rotation speed of the first engine 115, the current temperature of the first engine 115, or the like.

The operating parameter of the first engine 115 may be requested by the FCCs 205 from the ECCUs 203. The operating parameter may be one of several available operating parameters, and the operating parameter that is requested may be selected by the FCCs 205 according to the current flight control mode of the rotorcraft 101. As noted above, the output of the remaining first engine 115 is increased during an outage so that the rotorcraft 101 may continue maintaining the current conditions or mode. As such, different conditions may call for different output characteristics of the engines 115. For example, a first flight control mode may require a particular engine speed, and a second flight control mode may require a particular engine torque. In such embodiments, during an outage, the operating parameter requested from the first engine 115 may correspond to the operating parameters called for by the active flight mode. For example, when a first flight control mode requires a particular engine speed, the operating parameter of the first engine 115 may be the current engine speed.

In process 405, an engine output ramping rate is determined for the first engine 115. The engine output ramping rate is determined according to a difference between the operating parameter of the first engine 115 and a nominal limit of the first engine 115. The nominal limit is any limit of the first engine 115, such as a maximum continuous output limit (e.g., torque production, rotation speed, temperature, etc.). The nominal limit corresponds to the selected operating parameter. For example, when the operating parameter is the current rotation speed of the first engine 115, then the nominal limit may be the maximum rotation speed of the first engine 115. The maximum torque and maximum temperature may likewise be considered.

The difference between the operating parameter and the nominal limit may be thought of as the amount of output headroom the first engine 115. The engine output ramping rate may be a linear, nonlinear, or step function relating elapsed time to an output of the first engine 115. The rate of increase of the engine output ramping rate may be proportional to the engine output headroom such that the determined engine output ramping rate is more aggressive when the first engine 115 has more output headroom. For example, when the first engine 115 is operating at the nominal limit, then the engine output ramping rate may have a small rate of increase (see, e.g., FIG. 5A, discussed further below). Conversely, when the first engine 115 is operating below the nominal limit, then the engine output ramping rate may have a large rate of increase (see, e.g., FIG. 5B, discussed further below). The engine output ramping rate may be a step function when the first engine 115 is operating sufficiently below the nominal limit, e.g., when the difference between the operating parameter and the nominal limit is greater than a predetermined value.

The engine output ramping rate may be determined in several manners. In some embodiments, the engine output ramping rate is a value calculated at runtime, where the rate is determined based on a formula and the operating parameter of the first engine 115. In some embodiments, the engine output ramping rate is a predetermined value that may be selected from, e.g., a lookup table that is indexed according to the operating parameter.

In process 407, the output of the first engine 115 is increased in response to detecting an outage of another engine 115 of the rotorcraft 101. The outage of the other engine 115 may be detected by receiving a signal from the ECCU 203 of the other engine 115 that indicates an engine outage. Performing the temporary increase may be referred to as transitioning from an all-engines operative (AEO) scenario to a one-engine inoperative (OEI) scenario.

In some embodiments, the output of the first engine 115 is temporarily increased beyond the nominal limit of the first engine 115. The amount that the output of the first engine 115 is increased to may be referred to as a maximum temporary output limit. Although increasing the output of the engines 115 beyond their nominal limit may wear the engines 115 more quickly, it may also help prevent a total failure of the rotorcraft 101. The maximum temporary output limit is greater than the nominal limit and may be less than the maximum possible output of the engines 115. In an embodiment, the maximum temporary output limit is greater than the nominal limit by a predetermined margin that corresponds to the selected operating parameter. For example, when the operating parameter is engine rotation speed, the rotation speed of the first engine 115 may be increased beyond the maximum rotation speed of the first engine 115 by a predetermined rotation speed margin. The maximum torque and maximum temperature may likewise be considered.

Figure 5A:
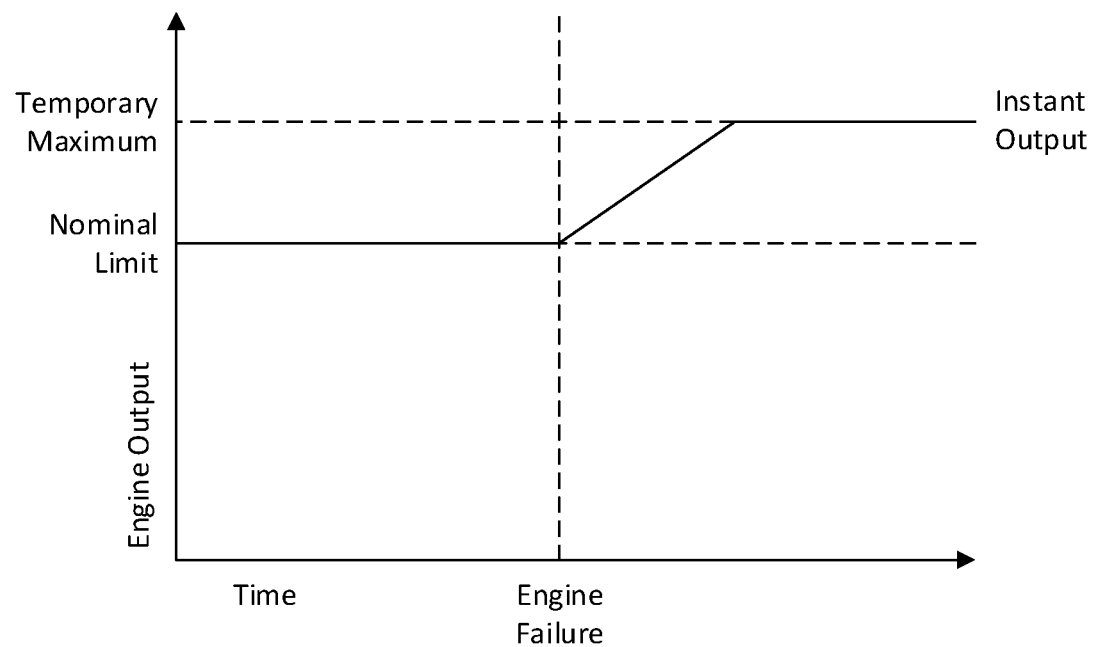
FIGS. 5A and 5B are graphs showing the output of an engine with respect to time.
Figure 5B:
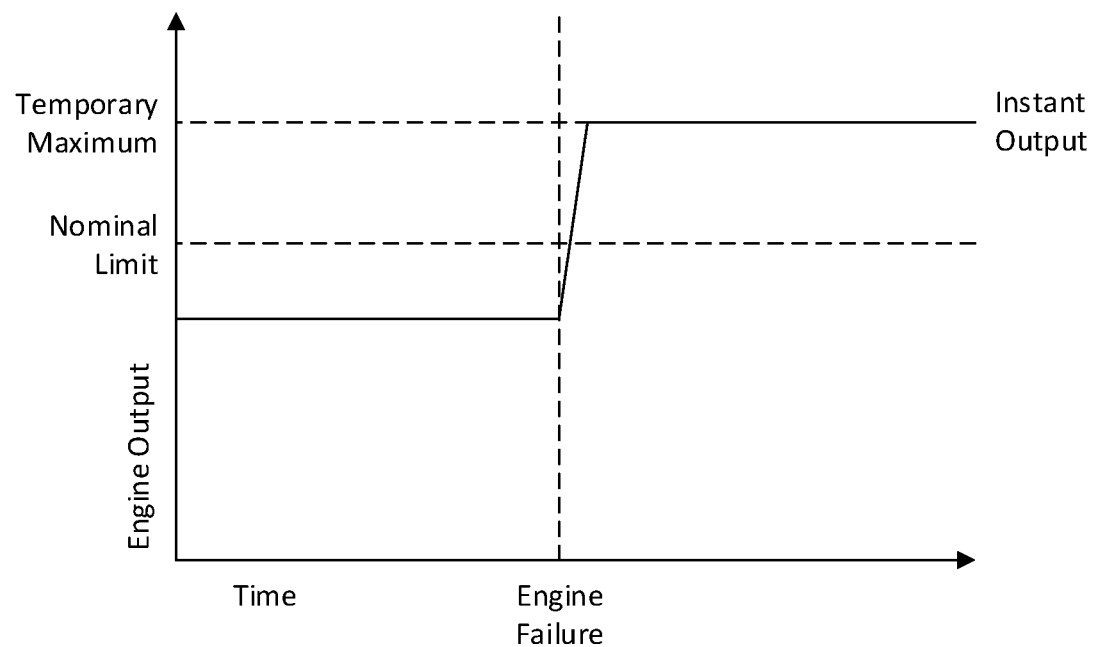

The output of the first engine 115 is increased according to the engine speed ramping rate. FIGS. 5A and 5B are graphs showing the output of the first engine 115 with respect to time, at different engine speed ramping rates. FIG. 5A illustrates increasing the output of the first engine 115 beyond the nominal limit using a small ramping rate. FIG. 5B illustrates increasing the output of the first engine 115 beyond the nominal limit using a large ramping rate.

Optionally, a wait may be performed. A predetermined amount of time may elapse after detecting the outage of the other engine 115 and before the output of the first engine 115 is temporarily increased. In an embodiment, a one second wait may be performed before switching from AEO to OEI. The one second wait may be a separate step performed by the FCCs 205, or may be incorporated into the engine speed ramping rate function.

Embodiments may achieve advantages. Increasing the output of the remaining engines 115 beyond the nominal limit during an OEI scenario may also help prevent a total failure of the rotorcraft 101. Using a gradual rate of increase instead of a step increase may reduce the chances of exceeding the maximum possible output of the engines 115 or drive system when the output of the remaining engines 115 is temporarily increased beyond the nominal limit, particularly when the remaining engines 115 are already operating at or near their nominal limit.

Although this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:
in response to detecting an outage of a first engine of a rotorcraft:
receiving an operating parameter of a second engine of the rotorcraft, the second engine being different from the first engine;
determining an engine output ramping rate for the second engine according to a difference between the operating parameter of the second engine and a nominal limit of the second engine, the engine output ramping rate having a first rate of increase when the difference between the operating parameter of the second engine and the nominal limit of the second engine is less than a predetermined value, the engine output ramping rate having a second rate of increase when the difference between the operating parameter of the second engine and the nominal limit of the second engine is greater than the predetermined value, the second rate of increase being greater than the first rate of increase; and increasing an output of the second engine according to the engine output ramping rate.

2. The method of claim 1, wherein increasing the output of the second engine comprises:
temporarily increasing the output of the second engine beyond the nominal limit of the second engine.

3. The method of claim 1, wherein determining the engine output ramping rate comprises:
calculating the engine output ramping rate at runtime according to the operating parameter of the second engine.

4. The method of claim 1, wherein determining the engine output ramping rate comprises:
selecting the engine output ramping rate from a lookup table, the lookup table being indexed according to the operating parameter of the second engine.

5. The method of claim 1, further comprising:
waiting a predetermined amount of time before increasing the output of the second engine.

6. The method of claim 1, wherein receiving the operating parameter comprises:
selecting the operating parameter from a plurality of operating parameters according to a flight control mode of the rotorcraft; and
requesting the operating parameter from the second engine.

7. The method of claim 1, wherein the nominal limit of the second engine is a maximum continuous rotation speed of the second engine, and wherein increasing the output of the second engine comprises:
temporarily increasing the output of the second engine such that a rotation speed of the second engine exceeds the maximum continuous rotation speed of the second engine by a first predetermined margin.

8. The method of claim 1, wherein the nominal limit of the second engine is a maximum continuous torque of the second engine, and wherein increasing the output of the second engine comprises:
temporarily increasing the output of the second engine such that a torque of the second engine exceeds the maximum continuous torque of the second engine by a second predetermined margin.

9. The method of claim 1, wherein the nominal limit of the second engine is a maximum continuous temperature of the second engine, and wherein increasing the output of the second engine comprises:
temporarily increasing the output of the second engine such that a temperature of the second engine exceeds the maximum continuous temperature of the second engine by a third predetermined margin.

10. The method of claim 1, wherein the engine output ramping rate is proportional to the difference between the operating parameter of the second engine and the nominal limit of the second engine.

11. A rotorcraft comprising:
a plurality of engines;
a flight control computer connected to the plurality of engines, the flight control computer being configured to, in response to detecting an outage of a first engine of the plurality of engines:
receive an operating parameter of a second engine of the plurality of engines, the second engine being different from the first engine;
determine an engine output ramping rate for the second engine according to a difference between the operating parameter of the second engine and a nominal limit of the second engine, the engine output ramping rate having a first rate of increase when the difference between the operating parameter of the second engine and the nominal limit of the second engine is less than a predetermined value, the engine output ramping rate having a second rate of increase when the difference between the operating parameter of the second engine and the nominal limit of the second engine is greater than the predetermined value, the second rate of increase being greater than the first rate of increase; and
increase an output of the second engine according to the engine output ramping rate.

12. The rotorcraft of claim 11, wherein the flight control computer increases the output of the second engine by:
temporarily increasing the output of the second engine beyond the nominal limit of the second engine.

13. The rotorcraft of claim 11, wherein the flight control computer determines the engine output ramping rate by:
calculating the engine output ramping rate at runtime according to the operating parameter of the second engine.

14. The rotorcraft of claim 11, wherein the flight control computer determines the engine output ramping rate by:
selecting the engine output ramping rate from a lookup table, the lookup table being indexed according to the operating parameter of the second engine.

15. The rotorcraft of claim 11, wherein the flight control computer is further configured to:
waiting a predetermined amount of time before increasing the output of the second engine.

16. The rotorcraft of claim 11, wherein the flight control computer receives the operating parameter by:
selecting the operating parameter from a plurality of operating parameters according to a flight control mode of the rotorcraft; and
requesting the operating parameter from the second engine.

17. The rotorcraft of claim 11, wherein the nominal limit of the second engine is a maximum continuous rotation speed of the second engine, and wherein the flight control computer increases the output of the second engine by:
temporarily increasing the output of the second engine such that a rotation speed of the second engine exceeds the maximum continuous rotation speed of the second engine by a first predetermined margin.

18. The rotorcraft of claim 11, wherein the nominal limit of the second engine is a maximum continuous torque of the second engine, and wherein the flight control computer increases the output of the second engine by:
temporarily increasing the output of the second engine such that a torque of the second engine exceeds the maximum continuous torque of the second engine by a second predetermined margin.

19. The rotorcraft of claim 11, wherein the nominal limit of the second engine is a maximum continuous temperature of the second engine, and wherein the flight control computer increases the output of the second engine by:
temporarily increasing the output of the second engine such that a temperature of the second engine exceeds the maximum continuous temperature of the second engine by a third predetermined margin.

20. The rotorcraft of claim 11, wherein the engine output ramping rate is proportional to the difference between the operating parameter of the second engine and the nominal limit of the second engine.

21. A flight control computer comprising:
a processor; and a non-transitory computer readable storage medium storing programming for execution by the processor, the programming including instructions for, in response to detecting an outage of a first engine of a rotorcraft:
receiving an operating parameter of a second engine of the rotorcraft, the second engine being different from the first engine;
determining an engine output ramping rate for the second engine according to a difference between the operating parameter of the second engine and a nominal limit of the second engine, the engine output ramping rate having a first rate of increase when the difference between the operating parameter of the second engine and the nominal limit of the second engine is less than a predetermined value, the engine output ramping rate having a second rate of increase when the difference between the operating parameter of the second engine and the nominal limit of the second engine is greater than the predetermined value, the second rate of increase being greater than the first rate of increase; and increasing an output of the second engine according to the engine output ramping rate.

\* \* \* \* \*